United States Patent [19]

Gauthier

[11] Patent Number: 4,472,308
[45] Date of Patent: Sep. 18, 1984

[54] AZO DYESTUFFS CONTAINING AN AMINO OR ACYLATED AMINO NAPHTHOL MONOSULFONIC ACID RADICAL AND AT LEAST ONE REACTIVE PHOSPHORIC OR PHOSPHONIC ACID GROUP

[75] Inventor: Donald R. Gauthier, Somerset, Mass.

[73] Assignee: ICI United States, Inc., Wilmington, Del.

[21] Appl. No.: 160,427

[22] Filed: Jun. 17, 1980

Related U.S. Application Data

[63] Continuation of Ser. No. 837,628, Sep. 27, 1977, abandoned.

[51] Int. Cl.$^3$ .................. C09B 62/82; C09B 62/825; C09B 62/83; D06P 3/66
[52] U.S. Cl. .................................. 260/199; 260/187; 260/190; 260/191; 260/198; 260/205; 260/206; 260/502.5 D; 260/507 R
[58] Field of Search .................. 260/187, 199, 201

[56] References Cited

U.S. PATENT DOCUMENTS 2,596,660  5/1952  Dickey ........................ 260/944

FOREIGN PATENT DOCUMENTS

| 2451005 | 4/1975  | Fed. Rep. of Germany | 260/199 |
| 2617314 | 11/1976 | Fed. Rep. of Germany | 260/186 |
| 2619887 | 11/1976 | Fed. Rep. of Germany | 260/199 |
| 2260657 | 9/1957  | France               | 260/199 |
| 396256  | 1/1966  | Switzerland          | 260/199 |

*Primary Examiner*—Floyd D. Higel
*Attorney, Agent, or Firm*—Cushman, Darby & Cushman

[57] ABSTRACT

Azo dyestuffs of the formulae:

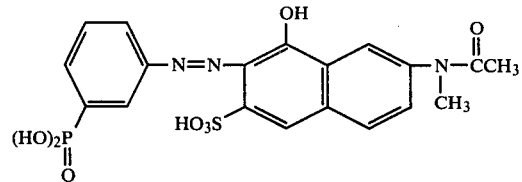

which are useful for reactively dyeing such cellulosic materials as cotton or cotton/polyester blends.

1 Claim, No Drawings

AZO DYESTUFFS CONTAINING AN AMINO OR ACYLATED AMINO NAPHTHOL MONOSULFONIC ACID RADICAL AND AT LEAST ONE REACTIVE PHOSPHORIC OR PHOSPHONIC ACID GROUP

This is a continuation of application Ser. No. 837,628 filed Sept. 27, 1977 now abandoned.

BACKGROUND OF THE INVENTION

This invention relates to dyestuffs which contain an amino or acylated amino naphthol mono-sulfonic acid radical and at least one phosphoric or phosphonic acid group and which are suitable for reactively dyeing cellulosic materials, e.g., cotton and cotton/polyester blends.

A process for reactively dyeing a hydroxy-substituted organic polymer, such as cellulose, is described by Stanford Research Institute in German Pat. No. 2,324,809, published Dec. 20, 1973. The process so described involves treating the cellulosic material with a dye containing a phosphonic acid group in the presence of a carbodiimide, e.g., dicyandiamide, in such a way that the dye is fixed to the cellulose in the form of a cellulose ester of phosphonic acid. The process can be illustrated in the following reaction:

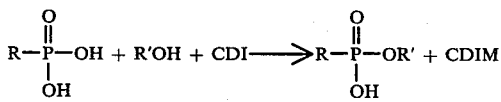

wherein R is a chromophore group, R'OH represents cellulose, CDI is the carbodiimide and CDIM is a residue or side product of carbodiimide. A similar mechanism applies for dyestuffs containing phosphoric acid groups. Cellulose materials so dyed exhibit good color stability when subsequently treated with alkaline detergents.

It is a primary object of the present invention to provide new fiber reactive dyestuffs which are especially suitable for coloring cellulose-based textile materials in the manner described in the above-mentioned German patent.

Still another object of this invention is to provide dyestuffs which may be employed in acid, neutral or alkaline baths to color cellulose materials.

These and other objects of the present invention will be apparent from the following description.

DESCRIPTION OF THE INVENTION

The azo dyestuffs of the invention may be illustrated by the formula:

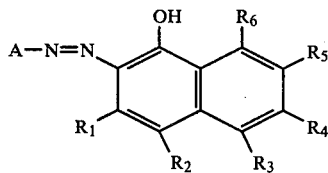

wherein A is an aromatic radical containing at least one phosphoric or phosphonic acid group; $R_1$ and $R_2$ are hydrogen or —$SO_3H$; and $R_3$–$R_6$ are hydrogen, —$SO_3H$, or $NR_7Q$ wherein $R_7$ is hydrogen or lower alkyl and Q is hydrogen or an acyl group of 2 to 8 carbon atoms, provided that only one of $R_1$–$R_6$ is —$SO_3H$ and at least one being —NHQ.

Preferably, A is a phenyl or naphthyl group which, apart from the phosphoric or phosphonic acid group or groups, is either unsubstituted or substituted with, for example, one or more halogen, alkyl, alkoxy, cyano, acetylamino, nitro, sulfonic acid or carboxylic acid groups. Typical halogen values include chlorine and bromine while the alkyl and alkoxy substituents will usually contain up to 6 carbon atoms, although longer chain lengths may also be used.

It is also contemplated that the dyestuffs of the present invention include those wherein A stands for a radical of azo benzene, azonaphthalene or phenylazonaphthalene series which, if desired, may be substituted as noted.

The dyestuffs of the invention may be prepared using conventional methods for preparing azo dyestuffs involving the preparation of a diazonium salt from a primary amine followed by coupling. See, for example, Vogel "Practical Organic Chemistry" (1951) of German Pat. No. 2,324,809. Thus, an aromatic primary amine containing at least one phosphoric or phosphonic acid group may be converted into its diazonium salt followed by coupling the diazonium salt with an amino or acylated amino naphthol mono-sulfonic acid which has a removable hydrogen attached to a carbon atom of the naphthalene ring. The diazonium salt of the aromatic primary amine may be prepared in any known way, e.g., by reacting the parent amine with sodium nitrite in the presence of HCl at low temperatures (such as 0°–15° C.). Coupling of this salt can be carried out by, for example, mixing an aqueous solution of the salt with the naphthol mono-sulfonic acid component at 0°–15° C. The resulting dyestuff can be recovered by precipitating the same and filtering or by using other conventional separation techniques.

The new dyes can be isolated as solid products by conventional means such as spray-drying or by precipitation and filtration. They are preferably isolated in the acid form or in the form of an ammonium salt or partly in one of these forms and partly as an alkali metal, e.g. Li, Na or K salt. These salts can be obtained by adding a halide e.g. the chloride of the desired alkali metal or ammonium halide or ammonia to the completed reaction mixture before isolation. Alternatively by addition of an alkanolamine e.g. diethanolamine to the completed reaction mixture, a highly soluble form of the dyestuff is obtained which can be used as a total liquor for the dyeing in printing process.

Aromatic primary amines containing a phosphonic acid group which may be converted to diazonium salts for use in preparing the dyestuffs of the invention may be described by the following formula:

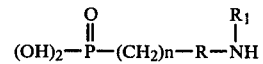

wherein:
R is a phenyl or naphthyl radical, unsubstituted or substituted with at least one substituent selected from the group consisting of halogen (e.g. bromine or chlorine), nitro, alkyl of 1–4 carbons, alkoxy of 1–4 carbons and phenoxy;
$R_1$ is hydrogen or alkyl of 1 to 4 carbon atoms; and
n is 0 or an integer of 1 to 4, but preferably 0.

Typical examples of phosphonic acid amines which can be diazotized for use herein include the following:
meta-aminophenyl phosphonic acid;
para-aminophenyl phosphonic acid;
meta-aminobenzyl phosphonic acid;
para-aminobenzyl phosphonic acid;
2,4,6-tribromo-4-aminophenyl phosphonic acid;
3-nitro-4-aminophenyl phosphonic acid;
3-amino-4-chlorophenyl phosphonic acid;
3-amino-4-methylphenyl phosphonic acid;
3-amino-4-phenoxyphenyl phosphonic acid;
3-amino-4-hydroxyphenyl phosphonic acid;
3-amino-4-orthochlorophenoxyphenyl phosphonic acid;
3-amino-4-bromophenyl phosphonic acid;
3-amino-4-methoxyphenyl phosphonic acid;
3-amino-4-methylphenyl phosphonic acid;
2-hydroxy-5-aminobenzyl phosphonic acid;
4-amino-1-naphthyl phosphonic acid;
4-amino-8-methyl-1-naphthyl phosphonic acid; and
4-amino-3-chloro-1-naphthyl phosphonic acid.

Aromatic primary amines containing a phosphoric acid group which may be converted to diazonium salts for use in preparing the dyestuffs of the invention may be described by the following formula:

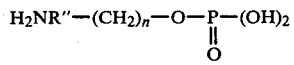

wherein:

R" is a phenyl or naphthyl radical, unsubstituted or substituted with at least one substituent selected from the group consisting of halogen (e.g. chlorine or bromine), nitro, alkyl of 1-4 carbons, alkoxy of 1-4 carbons and phenoxy; and n is 0 or a whole number from 1 to 4, but preferably 0.

Typical examples of phosphoric acid amines which can be diazotized for use herein include the following:
meta-aminophenyl phosphoric acid;
para-aminophenyl phosphoric acid;
meta-aminobenzyl phosphoric acid;
para-aminobenzyl phosphoric acid;
2,4,6-tribromo-4-aminophenyl phosphoric acid;
3-nitro-4-aminophenyl phosphoric acid;
3-amino-4-chlorophenyl phosphoric acid;
3-amino-4-methylphenyl phosphoric acid;
3-amino-4-phenoxyphenyl phosphoric acid;
3-amino-4-hydroxyphenyl phosphoric acid;
3-amino-4-orthochlorophenoxyphenyl phosphoric acid;
3-amino-4-bromophenyl phosphoric acid;
3-amino-4-methoxyphenyl phosphoric acid;
3-amino-4-methylphenyl phosphoric acid;
2-hydroxy-5-aminobenzyl phosphoric acid;
4-amino-1-naphthyl phosphoric acid;
4-amino-8-methyl-1-naphthyl phosphoric acid; and
4-amino-3-chloro-1-naphthyl phosphoric acid.

In a most preferred embodiment, A may be represented by the formulae:

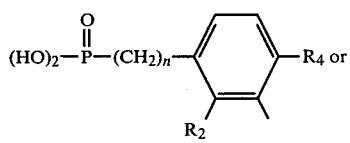

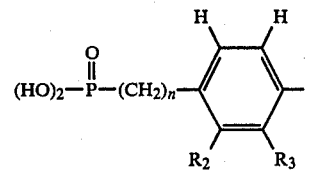

wherein:

n is 0 or an integer from 1 to 4;

$R_2$ is hydrogen or halogen;

$R_3$ is hydrogen or nitro; and $R_4$ is hydrogen, halogen, lower alkyl of 1 to 4 carbons, methyoxy, phenyoxy or R'—NH— where R' alkyl of 1 to 4 carbon atoms, hydroxy alkyl of 1 to 4 carbon atoms having a terminal sulfonic acid group.

If desired, any of the above amines may be coupled with such amines as p-xylidine, Peri acid, cresidine at a pH of about 3 to 5. Also, one may use either aniline or metatoluidine by way of the methane sulfonic acids. The resulting amino-monazo compounds may then be diazotized and coupled with the desired naphthol coupling component. Thus, suitable aminomonazo compounds include:

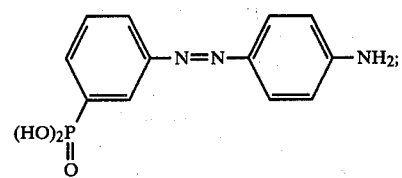

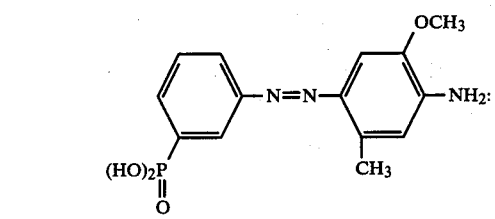

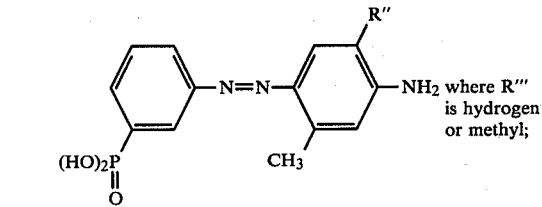

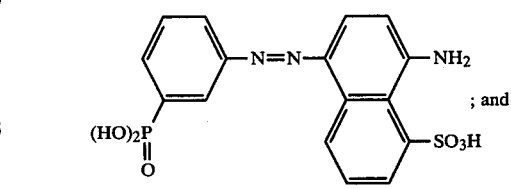

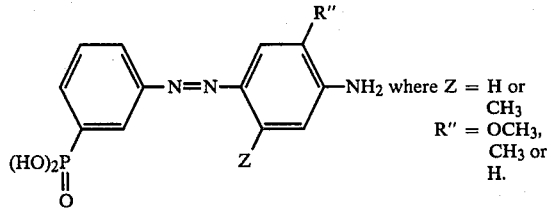

where Z = H or CH₃
R″ = OCH₃, CH₃ or H.

Typically, the naphthol component used to make the present dyestuffs is one of the following:
6-amino-1-naphthol-3-sulfonic acid (J-acid);
5-amino-1-naphthol-3-sulfonic acid (M-acid);
6-methylamino-1-naphthol-3-sulfonic acid;
7-methylamino-1-naphthol-3-sulfonic acid;
7-amino-1-naphthol-3-sulfonic acid (Gamma acid); and
8-amino-1-naphthol-5-sulfonic acid (S-acid);
wherein the amino group can be acylated to —NHQ wherein Q contains 2 to 8 carbon atoms and is preferably 2 to 4 carbon alkyl or aryl, e.g..:

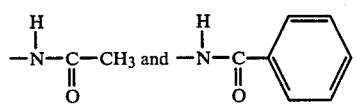

The lower alkyl amino counterparts of the naphthols referred to above may also be used to give acylated derivatives wherein the amino hydrogen in —NHQ is replaced by lower alkyl.

The new dyestuffs are soluble in water owing to the presence of phosphoric or phosphonic and sulfonic acid groups. They can be used, in general, for the coloration of textile materials which can be dyed by dues solubilized by anionic groups, e.g., natural and synthetic polyamide materials, e.g., wool, silk, polyhexamethylene adipamide and polycaproimide, but more especially, natural or regenerated cellulose textile materials, e.g., cotton, linen and viscose rayon; in the case of cellulose textile materials, they are preferably fixed on the fiber by baking at a temperature of from 95°–205° C. in the presence of a carbodiimide, e.g., cyanamide, dicyandiamide, as described in German Pat. No. 2,324,809.

The new dyestuffs are particularly suitable for application to mixed fabrics of cellulose and synthetics, e.g., polyester materials, together with disperse dyes from a single dyebath or printing paste. In this respect, the new dyestuffs show an advantage over most conventional reactive dyes which are normally applied in the presence of alkaline fixing agents. The latter lead to flocculation of the majority of disperse dyes, so that the range of the latter which can be applied together with conventional reactive dyes in single dyebaths or printing pastes is very limited. In contrast, the acid fixing conditions used for the new dyes have no effect on disperse dyes, and the two classes of dyes can be used together without difficulty.

The invention is illustrated but not limited by the following examples wherein parts are by weight unless otherwise stated.

EXAMPLE 1

The diazonium salt of meta-phosphanilic acid was coupled with acetyl-J-acid (6-aminoacetyl-1-naphthol-3 sulfonic acid) in a slurry at a pH of 7.5. After the coupling reaction was complete, the preparation was diluted from 1800 ml to 3500 ml at a temperature of 70° C. to dissolve the precipitate. The mixture was then allowed to self-precipitate by cooling to 35° C., the product filtered over a period of 1 ¾ hours to yield 90.8% of an azo product having the formula:

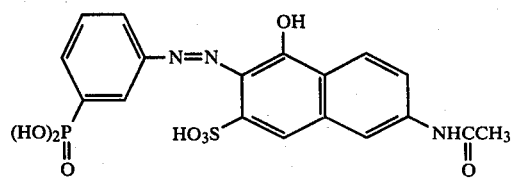

When applied to cellulosic textile materials by the methods described in German Pat. No. 2,324,809, the dyestuff gave an orange shade of excellent fastness to wet treatments.

EXAMPLE 2

The diazonium salt of 3-aminobenzene phosphonic acid was coupled with acetyl N-methyl-J-acid at a pH of 7 to 8. After coupling, the solution was heated to 50° C., salted with 10% w/v ammonium chloride, and cooled to 30° C. to precipitate the desired product. The precipitate was then filtered for 2¼ hours, yielding 61.9% of a reactive orange azo dyestuff having the formula:

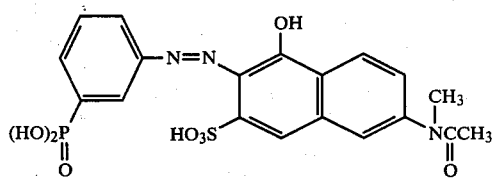

EXAMPLE 3

The diazonium salt of 3-aminobenzene phosphonic acid was coupled with acetyl N-methyl gamma acid (6-acetyl N-methyl-amino-1-naphthol-3 sulfonic acid) at a pH of 7 to 8. The solution was then heated to 50° C. and subsequently salted with 20% w/v ammonium chloride and cooled at 5° C. The precipitate was then filtered, yielding 48.4% of a reactive orange azo dyestuff having the formula:

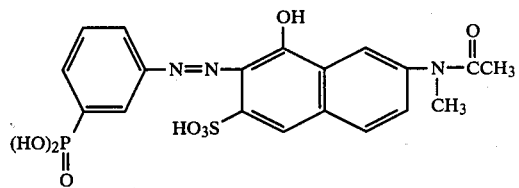

EXAMPLE 4

The diazonium salt of 3-aminobenzene phosphonic acid coupled with cresidine was coupled with acetyl-J-acid at a pH of 7 to 8 and a temperature of 0° to 5° C. The product self-precipitated upon completion of coupling and salting with 5% w/v ammonium chloride, followed by filtering at 5° C., yielding 71.4% of theory of a reactive red azo dyestuff having the formula:

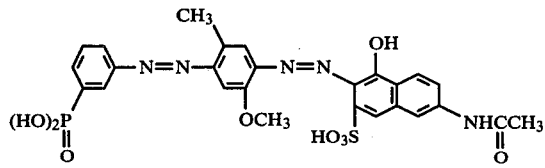

EXAMPLE 5

By omitting the addition of ammonium chloride in the procedure of Example 1 and replacing it by step of adding hydrochloric acid until the pH of the reaction is 0.5 the dyestuffs described in any of the preceding Examples may be obtained in their free acid form.

EXAMPLES 6-40

As shown in Table A below, monazo dyestuffs are prepared by diazotizing an aromatic phosphonic or phosphoric acid amine (I) and coupling at 0°-10° C. and pH 6-8 into an aminonaphthol mono sulfonic acid (II) previously N-acylated with an acyl anhydride or halide (III). The dyestuffs may be isolated as the free acids by the addition of acid to a pH below 4 followed by filtration or as the ammonium salts using ammonia as alkali during the preparation, followed by salting with ammonium chloride.

TABLE A

| EXAMPLE | I | II | III | COLOR |
|---|---|---|---|---|
| 6 | 3-Aminophenyl-phosphonic acid | 6-Amino-1-naphthol-3-sulfonic acid | Propionic anhydride | Orange |
| 7 | 3-Aminophenyl-phosphonic acid | 6-Amino-1-naphthol-3-sulfonc acid | Butyric anhydride | Reddish-Orange |
| 8 | 4-Aminophenyl-phosphonic acid | 6-Amino-1-naphthol-3-sulfonic acid | Acetic anhydride | Orange |
| 9 | 4-Aminophenyl-phosphonic acid | 6-Amino-1-naphthol-3-sulfonic acid | Propionic anhydride | Reddish-Orange |
| 10 | 4-Aminobenzyl-phosphonic acid | 6-Amino-1-naphthol-3-sulfonic acid | Acetic anhydride | Orange |
| 11 | 4-Aminobenzyl-phosphonic acid | 6-Amino-1-naphthol-3-sulfonic acid | Propionic anhydride | Reddish-Orange |
| 12 | 3-Aminophenyl-phosphonic acid | 4-Amino-1-naphthol-3-sulfonic acid | Acetic anhydride | Red |
| 13 | 3-Aminophenyl-phosphonic acid | 4-Amino-1-naphthol-3-sulfonic acid | Propionic anhydride | " |
| 14 | 4-Aminophenyl-phosphonic acid | 4-Amino-1-naphthol-3-sulfonic acid | Acetic anhydride | " |
| 15 | 4-Aminophenyl-phosphonic acid | 4-Amino-1-naphthol-3-sulfonic acid | Propionic anhydride | " |
| 16 | -Aminobenzyl-phosphonic acid | 4-Amino-1-naphthol-3-sulfonic acid | Acetic anhydride | " |
| 17 | 4-Aminophenyl-phosphoric acid | 4-Amino-1-naphthol-3-sulfonic acid | Propionic anhydride | " |
| 18 | 3-Aminophenyl-phosphonic acid | 6-Methylamino-1-naphthol-3-sulfonic acid | Propionic anhydride | Reddish-Orange |
| 19 | 3-Aminophenyl-phosphonic acid | 6-Methylamino-1-naphthol-3-sulfonic acid | Butyric anhydride | Reddish-Orange |
| 20 | 4-Aminophenyl-phosphonic acid | 6-Methylamino-1-naphthol-3-sulfonic acid | Acetic anhydride | Reddish-Orange |
| 21 | 4-Aminophenyl-phosphonic acid | 6-Methylamino-1-naphthol-3-sulfonic acid | Propionic anhydride | Reddish-Orange |
| 22 | 4-Aminobenzyl-phosphonic acid | 6-Methylamino-1-naphthol-3-sulfonic acid | Acetic anhydride | Reddish-Orange |
| 23 | 4-Aminobenzyl-phosphonic acid | 6-Methylamino-1-naphthol-3-sulfonic acid | Propionic anhydride | Reddish-Orange |
| 24 | 3-Amino-4-methylphenyl-2-phosphonic acid | 6-Methylamino-1-naphthol-3-sulfonic acid | Acetic anhydride | Orange |
| 25 | 3-Amino-4-methylphenyl-2-phosphonic acid | 6-Methylamino-1-naphthol-3-sulfonic acid | Propionic anhydride | " |
| 26 | 3-Aminophenyl-phosphonic acid | 7-Methylamino-1-naphthol-3-sulfonic acid | Acetic anhydride | Orange |
| 27 | 3-Aminophenyl-phosphonic acid | 7-Methylamino-1-naphthol-3-sulfonic acid | Propionic anhydride | " |
| 28 | 4-Aminophenyl-phosphonic acid | 7-Methylamino-1-naphthol-3-sulfonic acid | Acetic anhydride | " |
| 29 | 4-Aminophenyl-phosphonic acid | 7-Methylamino-1-naphthol-3-sulfonic acid | Propionic anhydride | " |
| 30 | 4-Aminobenzyl-phosphonic acid | 7-Methylamino-1-naphthol-3-sulfonic acid | Acetic anhydride | " |
| 31 | 4-Aminobenzyl-phosphonic acid | 7-Methylamino-1-naphthol-3-sulfonic acid | Propionic anhydride | " |
| 32 | 3-Aminophenyl-phosphonic acid | 8-Amino-1-naphthol-5-sulfonic acid | Acetic anhydride | Red |
| 33 | 3-Aminophenyl-phosphonic acid | 8-Amino-1-naphthol-5-sulfonic acid | Propionic anhydride | " |
| 34 | 4-Aminophenyl-phosphonic acid | 8-Amino-1-naphthol-5-sulfonic acid | Acetic anhydride | " |
| 35 | 4-Aminophenyl-phosphonic acid | 8-Amino-1-naphthol-5-sulfonic acid | Propionic anhydride | " |
| 36 | 4-Aminophenyl-phosphonic acid | 8-Amino-1-naphthol-5-sulfonic acid | Butyric anhyride | " |
| 37 | 4-Aminophenyl-phosphoric | 8-Amino-1-naphthol-5- | Acetic anhydride | " |

TABLE A-continued

| EXAMPLE | I | II | III | COLOR |
|---|---|---|---|---|
| | acid | sulfonic acid | | |
| 38 | 4-Aminophenyl-phosphoric acid | 8-Amino-1-naphthol-5-sulfonic acid | Propionic anhydride | " |
| 39 | 4-Aminobenzyl-phosphonic acid | 8-Amino-1-naphthol-5-sulfonic acid | " | " |
| 40 | 4-Aminobenzyl-phosphonic acid | 8-Amino-1-naphthol-5-sulfonic acid | Acetic anhydride | " |

The dyestuffs of Examples 6–40 may be isolated as the deacylated free acids by heating with hydrochloric acid at pH 0.5 to 2.0 and 50°–70° C. after completion of coupling, cooling to 10°–25° C. and filtering. The deacylated dyestuffs may be isolated as ammonium salts by neutralizing the hydrolysis mass to pH 7.0–8.0 with ammonia followed by salting with ammonium chloride and filtering.

EXAMPLES 41–160

Disazo dyestuffs are prepared by coupling a diazotized aromatic phosphonic or phosphoric acid amine (I) into aromatic amines (IV) capable of undergoing coupling at 0°–10° C. and pH 4–5 such as p-xylidene, o-anisidine, cresidine and Peri acid or aniline via the omega methane sulfonic acid. The resulting Monazo compound may be first isolated by salting and filtration or used directly as a diazo component by diazotization at 0°–20° C. and coupling at pH 6–9 into an aminonaphthol mono-sulfonic acid (II) previously N-acylated with an acyl anhydride or halide. The dyestuffs (see Table B) may be isolated as the free acids by precipitation at pH 1–3 with acid and filtering, or as ammonium salts by precipitation with ammonium chloride after completion of coupling.

TABLE B

| EXAMPLE | I | IV | II | III | COLOR |
|---|---|---|---|---|---|
| 41 | 3-Aminophenyl-phosphonic acid | Cresidine | 6-Amino-1-naphthol-3-sulfonic acid | Propionic anhydride | Bluish-red |
| 42 | 3-Aminophenyl-phosphonic acid | 1,6-Cleaves acid | 6-Amino-1-naphthol-3-sulfonic acid | Acetic anhydride | Reddish-violet |
| 43 | 3-Aminophenyl-phosphonic acid | 2,5-xylidine | 6-Amino-1-naphthol-3-sulfonic acid | " | Red |
| 44 | 3-Aminophenyl-phosphonic acid | " | 6-Amino-1-naphthol-3-sulfonic acid | Propionic anhydride | " |
| 45 | 3-Aminophenyl-phosphonic acid | Peri acid | 6-Amino-1-naphthol-3-sulfonic acid | Acetic anhydride | Reddish-violet |
| 46 | 3-Aminophenyl-phosphonic acid | m-Toluidine | 6-Amino-1-naphthol-3-sulfonic acid | " | Red |
| 47 | 3-Aminophenyl-phosphonic acid | o-Anisidine | 6-Amino-1-naphthol-3-sulfonic acid | " | " |
| 48 | 3-Aminophenyl-phosphonic acid | Aniline | 6-Amino-1-naphthol-3-sulfonic acid | " | Yellowish-red |
| 49 | 3-Aminophenyl-phosphonic acid | o-Toluidine | 6-Amino-1-naphthol-3-sulfonic acid | " | Red |
| 50 | 4-Aminophenyl-phosphonic acid | Peri acid | 6-Amino-1-naphthol-3-sulfonic acid | " | Violet |
| 51 | 4-Aminophenyl-phosphonic acid | Cresidine | 6-Amino-1-naphthol-3-sulfonic acid | " | Bluish-red |
| 52 | 4-Aminophenyl-phosphonic acid | " | 6-Amino-1-naphthol-3-sulfonic acid | Propionic anhydride | Bluish-red |
| 53 | 4-Aminophenyl-phosphonic acid | p-xylidine | 6-Amino-1-naphthol-3-sulfonic acid | Acetic anhydride | Bluish-red |
| 54 | 4-Aminophenyl-phosphonic acid | 1,7-Cleaves acid | 6-Amino-1-naphthol-3-sulfonic acid | " | Reddish-voilet |
| 55 | 4-Aminophenyl-phosphonic acid | o-Anisidine | 6-Amino-1-naphthol-3-sulfonic acid | Acetic anhydride | Red |
| 56 | 4-Aminophenyl-phosphonic acid | m-Toluidine | 6-Amino-1-naphthol-3-sulfonic acid | " | " |
| 57 | 4-Aminophenyl-phosphonic acid | Aniline | 6-Amino-1-naphthol-3-sulfonic acid | " | " |
| 58 | 4-Aminobenzyl-phosphonic acid | Cresidine | 6-Amino-1-naphthol-3-sulfonic acid | " | Bluish-red |
| 59 | 4-Aminobenzyl-phosphonic acid | Peri acid | 6-Amino-1-naphthol-3-sulfonic acid | " | Violet |
| 60 | 4-Aminobenzyl-phosphonic acid | 1,6-Cleaves acid | 6-Amino-1-naphthol-3-sulfonic acid | " | Red-violet |
| 61 | 4-Aminobenzyl-phosphonic acid | o-Toluidine | 6-Amino-1-naphthol-3-sulfonic acid | " | Red |
| 62 | 4-Aminobenzyl-phosphonic acid | m-Toluidine | 6-Amino-1-naphthol-3-sulfonic acid | " | " |
| 63 | 4-Aminobenzyl-phosphonic acid | o-Anisidine | 6-Amino-1-naphthol-3-sulfonic acid | " | Bluish-red |
| 64 | 4-Aminobenzyl-phosphonic acid | Aniline | 6-Amino-1-naphthol-3-sulfonic acid | " | Yellowish-red |
| 65 | 4-Aminobenzyl-phosphonic acid | p-xylidine | 6-Amino-1-naphthol-3-sulfonic acid | " | Bluish-red |
| 66 | 4-Aminobenzyl-phosphonic acid | " | 6-Amino-1-naphthol-3-sulfonic acid | Propionic anhydride | Bluish-red |
| 67 | 3-Aminophenyl- | Cresidine | 6-Methylamino-1- | Acetic anhydride | Bluish- |

TABLE B-continued

| EXAMPLE | I | IV | II | III | COLOR |
|---|---|---|---|---|---|
| | phosphonic acid | | naphthol-3-sulfonic acid | | red |
| 68 | 3-Aminophenyl-phosphonic acid | Peri acid | 6-Methylamino-1-naphthol-3-sulfonic acid | " | Violet |
| 69 | 3-Aminophenyl-phosphonic acid | o-Anisidine | 6-Methylamino-1-naphthol-3-sulfonic acid | Acetic anhydride | Violet |
| 70 | 3-Aminophenyl-phosphonic acid | o-Toluidine | 6-Methylamino-1-naphthol-3-sulfonic acid | " | Reddish-violet |
| 71 | 3-Aminophenyl-phosphonic acid | Aniline | 6-Methylamino-1-naphthol-3-sulfonic acid | " | Red |
| 72 | 3-Aminophenyl-phosphonic acid | p-xylidine | 6-Methylamino-1-naphthol-3-sulfonic acid | " | Violet |
| 73 | 3-Aminophenyl-phosphonic acid | 1,6-Cleaves acid | 6-Methylamino-1-naphthol-3-sulfonic acid | " | Bluish-violet |
| 74 | 3-Aminophenyl-phosphonic acid | m-Toluidine | 6-Methylamino-1-naphthol-3-sulfonic acid | " | Reddish-violet |
| 75 | 4-Aminophenyl-phosphonic acid | " | 6-Methylamino-1-naphthol-3-sulfonic acid | " | Reddish-violet |
| 76 | 4-Aminophenyl-phosphonic acid | Peri acid | 6-Methylamino-1-naphthol-3-sulfonic acid | " | Violet |
| 77 | 4-Aminophenyl-phosphonic acid | o-Anisidine | 6-Methylamino-1-naphthol-3-sulfonic acid | " | " |
| 78 | 4-Aminophenyl-phosphonic acid | Aniline | 6-Methylamino-1-naphthol-3-sulfonic acid | " | Bluish-red |
| 79 | 4-Aminophenyl-phosphonic acid | p-xylidine | 6-Methylamino-1-naphthol-3-sulfonic acid | " | Violet |
| 80 | 4-Aminophenyl-phosphonic acid | o-Toluidine | 6-Methylamino-1-naphthol-3-sulfonic acid | " | Reddish-violet |
| 81 | 4-Aminophenyl-phosphonic acid | 1,7-Cleaves acid | 6-Methylamino-1-naphthol-3-sulfonic acid | " | Bluish-violet |
| 82 | 4-Aminophenyl-phosphonic acid | Cresidine | 6-Methylamino-1-naphthol-3-sulfonic acid | Acetic anhydride | Violet |
| 83 | 4-Aminobenzyl-phosphonic acid | Peri acid | 6-Methylamino-1-naphthol-3-sulfonic acid | " | " |
| 84 | 4-Aminobenzyl-phosphonic acid | 1,6-Cleaves acid | 6-Methylamino-1-naphthol-3-sulfonic acid | " | Bluish-violet |
| 85 | 4-Aminobenzyl-phosphonic acid | o-Anisidine | 6-Methylamino-1-naphthol-3-sulfonic acid | " | Reddish-violet |
| 86 | 4-Aminobenzyl-phosphonic acid | o-Toluidine | 6-Methylamino-1-naphthol-3-sulfonic acid | " | Reddish-violet |
| 87 | 4-Aminobenzyl-phosphonic acid | Aniline | 6-Methylamino-1-naphthol-3-sulfonic acid | " | Red |
| 88 | 4-Aminobenzyl-phosphonic acid | 1,7-Cleaves acid | 6-Methylamino-1-naphthol-3-sulfonic acid | " | Bluish-violet |
| 89 | 4-Aminobenzyl-phosphonic acid | p-xylidine | 6-Methylamino-1-naphthol-3-sulfonic acid | " | Violet |
| 90 | 4-Aminobenzyl-phosphonic acid | Cresidine | 6-Methylamino-1-naphthol-3-sulfonic acid | " | " |
| 91 | 3-Aminophenyl-phosphonic acid | Peri acid | 5-Amino-1-naphthol-3-sulfonic acid | " | Blue-violet |
| 92 | 3-Aminophenyl-phosphonic acid | 1,6-Cleaves acid | 5-Amino-1-naphthol-3-sulfonic acid | " | Blue-violet |
| 93 | 3-Aminophenyl-phosphonic acid | Cresidine | 5-Amino-1-naphthol-3-sulfonic acid | " | Blue-violet |
| 94 | 3-Aminophenyl-phosphonic acid | m-Toluidine | 5-Amino-1-naphthol-3-sulfonic acid | " | Violet |
| 95 | 3-Aminophenyl-phosphonic acid | Aniline | 5-Amino-1-naphthol-3-sulfonic acid | " | Bluish-red |
| 96 | 3-Aminophenyl- | o-Toluidine | 5-Amino-1-naphthol- | Acetic anhydride | Violet |

TABLE B-continued

| EXAMPLE | I | IV | II | III | COLOR |
|---|---|---|---|---|---|
| | phosphonic acid | | 3-sulfonic acid | | |
| 97 | 3-Aminophenyl-phosphonic acid | o-Anisidine | 5-Amino-1-naphthol-3-sulfonic acid | " | " |
| 98 | 3-Aminophenyl-phosphonic acid | " | 5-Amino-1-naphthol-3-sulfonic acid | Butyric anhydride | " |
| 99 | 3-Aminophenyl-phosphonic acid | 1,7-Cleaves acid | 5-Amino-1-naphtol-3-sulfonic acid | Propionic anhydride | Blue violet |
| 100 | 4-Aminophenyl-phosphonic acid | 1,6-Cleaves acid | 5-Amino-naphthol-3-sulfonic acid | " | Blue violet |
| 101 | 4-Aminophenyl-phosphonic acid | Cresidine | 5-Amino-1-naphthol-3-sulfonic acid | " | Blue violet |
| 102 | 4-Aminophenyl-phosphonic acid | o-Anisidine | 5-Amino-1-naphthol-3-sulfonic acid | " | Violet |
| 103 | 4-Aminophenyl-phosphonic acid | Peri acid | 5-Amino-1-naphthol-3-sulfonic acid | " | Blue-violet |
| 104 | 4-Aminophenyl-phosphonic acid | Aniline | 5-Amino-1-naphthol-3-sulfonic acid | " | Bluish-red |
| 105 | 4-Aminophenyl-phosphonic acid | o-Toluidine | 5-Amino-1-naphthol-3-sulfonic acid | Acetic anhydride | Red-violet |
| 106 | 4-Aminophenyl-phosphonic acid | m-Toluidine | 5-Amino-1-naphthol-3-sulfonic acid | " | Red-violet |
| 107 | 4-Aminobenzyl-phosphonic acid | Peri acid | 5-Amino-1-naphthol-3-sulfonic acid | " | Blue-violet |
| 108 | 4-Aminobenzyl-phosphonic acid | Cresidine | 5-Amino-1-naphthol-3-sulfonic acid | " | Blue-violet |
| 109 | 4-Aminobenzyl-phosphonic acid | 1,7-Cleaves acid | 5-Amino-1-naphthol-3-sulfonic acid | Acetic anhydride | Blue violet |
| 110 | 4-Aminobenzyl-phosphonic acid | o-Anisidine | 5-Amino-1-naphthol-3-sulfonic acid | " | Violet |
| 111 | 4-Aminobenzyl-phosphonic acid | Aniline | 5-Amino-1-naphthol-3-sulfonic acid | " | Bluish-red |
| 112 | 4-Aminobenzyl-phosphonic acid | o-Toluidine | 5-Amino-1-naphthol-3-sulfonic acid | " | Violet |
| 113 | 4-Aminobenzyl-phosphonic acid | m-Toluidine | 5-Amino-1-naphthol-3-sulfonic acid | " | " |
| 114 | 3-Aminophenyl-phosphonic acid | Peri acid | 7-Amino-1-naphthol-3-sulfonic acid | " | " |
| 115 | 3-Aminophenyl-phosphonic acid | Cresidine | 7-Amino-1-naphthol-3-sulfonic acid | " | Red-violet |
| 116 | 3-Aminophenyl-phosphonic acid | Aniline | 7-Amino-1-naphthol-3-sulfonic acid | " | Red |
| 117 | 3-Aminophenyl-phosphonic acid | m-Toluidine | 7-Amino-1-naphthol-3-sulfonic acid | " | " |
| 118 | 3-Aminophenyl-phosphonic acid | o-Toluidine | 7-Amino-1-naphthol-3-sulfonic acid | " | " |
| 119 | 3-Aminophenyl-phosphonic acid | o-Anisidine | 7-Amino-1-naphthol-3-sulfonic acid | " | Bluish-red |
| 120 | 3-Aminophenyl-phosphonic acid | 1,6-Cleaves acid | 7-Amino-1-naphthol-3-sulfonic acid | " | Violet |
| 121 | 4-Aminophenyl-phosphonic acid | Peri acid | 7-Amino-1-naphthol-3-sulfonic acid | Acetic anhydride | Violet |
| 122 | 4-Aminophenyl-phosphonic acid | Cresidine | 7-Amino-1-naphthol-3-sulfonic acid | " | Bluish-red |
| 123 | 4-Aminophenyl-phosphonic acid | Aniline | 7-Amino-1-naphthol-3-sulfonic acid | " | Red |
| 124 | 4-Aminophenyl-phosphonic acid | " | 7-Amino-1-naphthol-3-sulfonic acid | Propionic anhydride | " |
| 125 | 4-Aminophenyl-phosphonic acid | m-Toluidine | 7-Amino-1-naphthol-3-sulfonic acid | " | " |
| 126 | 4-Aminophenyl-phosphonic acid | " | 7-Amino-1-naphthol-3-sulfonic acid | Acetic anhydride | " |
| 127 | 4-Aminophenyl-phosphonic acid | 1,6-Cleaves acid | 7-Amino-1-naphthol-3-sulfonic acid | " | Violet |
| 128 | 4-Aminophenyl-phosphonic acid | o-Anisidine | 7-Amino-1-naphthol-3-sulfonic acid | " | Bluish-red |
| 129 | 4-Aminophenyl-phosphonic acid | o-Toluidine | 7-Amino-1-naphthol-3-sulfonic acid | " | Red |
| 130 | 4-Aminobenzyl-phosphonic acid | Peri acid | 7-Amino-1-naphthol-3-sulfonic acid | " | Violet |
| 131 | 4-Aminobenzyl-phosphonic acid | Cresidine | 7-Amino-1-naphthol-3-sulfonic acid | " | Bluish-red |
| 132 | 4-Aminobenzyl-phosphonic acid | Aniline | 7-Amino-1-naphthol-3-sulfonic acid | " | Red |
| 133 | 4-Aminobenzyl-phosphonic acid | m-Toluidine | 7-Amino-1-naphthol-3-sulfonic acid | Acetic anhydride | Red |
| 134 | 4-Aminobenzyl-phosphonic acid | o-Anisidine | 7-Amino-1-naphthol-3-sulfonic acid | " | Bluish-red |
| 135 | 4-Aminobenzyl-phosphonic acid | 1,6-Cleaves acid | 7-Amino-1-naphthol-3-sulfonic acid | " | Violet |
| 136 | 4-Aminobenzyl-phosphonic acid | p-xylidine | 7-Amino-1-naphthol-3-sulfonic acid | " | Bluish-red |

TABLE B-continued

| EXAMPLE | I | IV | II | III | COLOR |
|---|---|---|---|---|---|
| 137 | 3-Aminophenyl-phosphonic acid | Cresidine | 7-Methylamino-1-naphthol-3-sulfonic acid | Acetic anhydride | Red-violet |
| 138 | 3-Aminophenyl-phosphonic acid | Peri acid | 7-Methylamino-1-naphthol-3-sulfonic acid | " | Violet |
| 139 | 3-Aminophenyl-phosphonic acid | Aniline | 7-Methylamino-1-naphthol-3-sulfonic acid | " | Bluish-red |
| 140 | 3-Aminophenyl-phosphonic acid | p-xylidine | 7-Methylamino-1-naphthol-3-sulfonic acid | " | Bluish-red |
| 141 | 3-Aminophenyl-phosphonic acid | o-Toluidine | 7-Methylamino-1-naphthol-3-sulfonic acid | " | Bluish-red |
| 142 | 3-Aminophenyl-phosphonic acid | m-Toluidine | 7-Methylamino-1-naphthol-3-sulfonic acid | " | Bluish-red |
| 143 | 3-Aminophenyl-phosphonic acid | 1,7-Cleaves acid | 7-Methylamino-1-naphthol-3-sulfonic acid | " | Violet |
| 144 | 3-Aminophenyl-phosphonic acid | o-Anisidine | 7-Methylamino-1-naphthol-3-sulfonic acid | " | " |
| 145 | 4-Aminophenyl-phosphonic acid | Peri acid | 7-Methylamino-1-naphthol-3-sulfonic acid | " | Violet |
| 146 | 4-Aminophenyl-phosphonic acid | Cresidine | 7-Methylamino-1-naphthol-3-sulfonic acid | Acetic anhydride | Violet |
| 147 | 4-Aminophenyl-phosphonic acid | o-Anisidine | 7-Methylamino-1-naphthol-3-sulfonic acid | " | Red-violet |
| 148 | 4-Aminophenyl-phosphonic acid | m-Toluidine | 7-Methylamino-1-naphthol-3-sulfonic acid | " | Bluish-red |
| 149 | 4-Aminophenyl-phosphonic acid | o-Toluidine | 7-Methylamino-1-naphthol-3-sulfonic acid | " | Bluish-red |
| 150 | 4-Aminophenyl-phosphonic acid | Aniline | 7-Methylamino-1-naphthol-3-sulfonic acid | " | Bluish-red |
| 151 | 4-Aminophenyl-phosphonic acid | 1,6-Cleaves Acid | 7-Methylamino-1-naphthol-3-sulfonic acid | Acetic anhydride | Violet |
| 152 | 4-Aminophenyl-phosphonic acid | p-xylidine | 7-Methylamino-1-naphthol-3-sulfonic acid | " | Bluish-red |
| 153 | 4-Aminobenzyl-phosphonic acid | Cresidine | 7-Methylamino-1-naphthol-3-sulfonic acid | " | Red-violet |
| 154 | 4-Aminobenzyl-phosphonic acid | m-Toluidine | 7-Methylamino-1-naphthol-3-sulfonic acid | " | Bluish-red |
| 155 | 4-Aminobenzyl-phosphonic acid | 1,7-Cleaves acid | 7-Methylamino-1-naphthol-3-sulfonic acid | " | Violet |
| 156 | 4-Aminobenzyl-phosphonic acid | o-Anisidine | 7-Methylamino-1-naphthol-3-sulfonic acid | " | Red-violet |
| 157 | 4-Aminobenzyl-phosphonic acid | o-Toluidine | 7-Methylamino-1-naphthol-3-sulfonic acid | Acetic anhydride | Bluish-red |
| 158 | 4-Aminobenzyl-phosphonic acid | Peri acid | 7-Methylamino-1-naphthol-3-sulfonic acid | " | Violet |
| 159 | 4-Aminobenzyl-phosphonic acid | Aniline | 7-Methylamino-1-naphthol-3-sulfonic acid | " | Bluish-red |
| 160 | 4-Aminobenzyl-phosphonic acid | p-xylidine | 7-Methylamino-1-naphthol-3-sulfonic acid | " | Red-violet |

The dyestuffs of Examples 41–160 may be isolated as the deacylated free acids by heating with hydrochloric acid at pH 0.5 to 2.0 and 50°–70° C. after completion of coupling, cooling to 10°–25° C. and filtering. The deacetylated dyestuffs may be isolated as ammonium salts by neutralizing the hydrolyzed coupling with ammonia to pH 7–8 followed by salting with ammonium chloride and filtering.

It will be appreciated that various modifications may be made in the invention described herein. Hence, the scope of the invention is defined in the following claims wherein;
I claim:
1. A dyestuff having the formula:
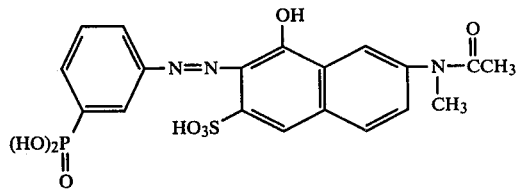

As referred to herein, it is understood that the dyestuffs and formulas are applicable to both the free acid and salt forms.